United States Patent
Wallner (10) Patent No.: US 10,029,192 B2
(45) Date of Patent: Jul. 24, 2018

(54) FILTER AND METHODS OF MANUFACTURING THE SAME

(71) Applicant: WALLNER TOOLING\EXPAC, INC., Rancho Cucamonga, CA (US)

(72) Inventor: Michael H. Wallner, Alta Loma, CA (US)

(73) Assignee: WALLNER TOOLING/EXPAC, INC., Ontario, CA (US)

( * ) Notice: Subject to any disclaimer, the term of this patent is extended or adjusted under 35 U.S.C. 154(b) by 117 days.

(21) Appl. No.: 14/058,090

(22) Filed: Oct. 18, 2013

(65) Prior Publication Data

US 2015/0107202 A1 Apr. 23, 2015

(51) Int. Cl.
*B01D 46/00* (2006.01)
*B01D 29/05* (2006.01)
*B01D 46/10* (2006.01)
*B01D 29/01* (2006.01)

(52) U.S. Cl.
CPC ........... *B01D 29/05* (2013.01); *B01D 29/012* (2013.01); *B01D 46/0005* (2013.01); *B01D 46/10* (2013.01); *Y10T 29/49826* (2015.01)

(58) Field of Classification Search
CPC ...... B01D 46/05; B01D 46/10; B01D 46/521; B01D 2279/50; B01D 2279/203; B01D 2279/04; B01D 46/0005; B01D 2265/06
USPC ........................... 55/481, 491, 496, 501, 524
See application file for complete search history.

(56) References Cited

U.S. PATENT DOCUMENTS

| | | | | |
|---|---|---|---|---|
| 3,298,149 A | * | 1/1967 | Sobeck | F02M 35/026 210/315 |
| 4,323,373 A | * | 4/1982 | Fritz | B01D 46/12 126/299 D |
| 5,145,500 A | * | 9/1992 | Nolen, Jr. | B01D 46/10 55/501 |
| 6,152,980 A | | 11/2000 | Culwell | |
| 6,200,465 B1 | * | 3/2001 | Carawan | B01D 46/008 210/238 |
| 6,293,410 B1 | * | 9/2001 | Forbes | 210/446 |
| 7,497,888 B2 | * | 3/2009 | Ashwood et al. | 55/499 |
| 7,758,667 B2 | | 7/2010 | Ashwood et al. | |
| 2004/0188647 A1 | * | 9/2004 | Lind | G01T 1/2014 250/586 |

(Continued)

*Primary Examiner* — Heidi R Kelley
*Assistant Examiner* — Karla Hawkins
(74) *Attorney, Agent, or Firm* — Lewis Roca Rothgerber Christie LLP (57) ABSTRACT

A filter is configured to be used in a variety of different devices to filter particulate matter from a fluid (e.g., air or water), such as residential or commercial air filtration systems, automobile filtration systems, and water filtration systems. In one embodiment, the filter includes a filter medium and a support member. At least one inwardly deflected portion of the support member engages at least one portion of the filter medium to couple the support member to the filter medium. In one embodiment, the deflected portion of the support member may be deflected inward at an angle between approximately 90 degrees and approximately 180 degrees. The filter medium may be any suitable filtration material, such as fiberglass, paper, or vegetable fibers (e.g., cotton). The support member may be constructed of expanded metal, wire mesh, or a flat plate.

26 Claims, 9 Drawing Sheets

(56) References Cited

U.S. PATENT DOCUMENTS

2012/0067015 A1* 3/2012 Greenwood ....... B01D 46/0001
55/490
2013/0079508 A1* 3/2013 Mahlig ................. B01D 29/23
536/61

* cited by examiner

FILTER AND METHODS OF MANUFACTURING THE SAME

BACKGROUND

Figure 1:
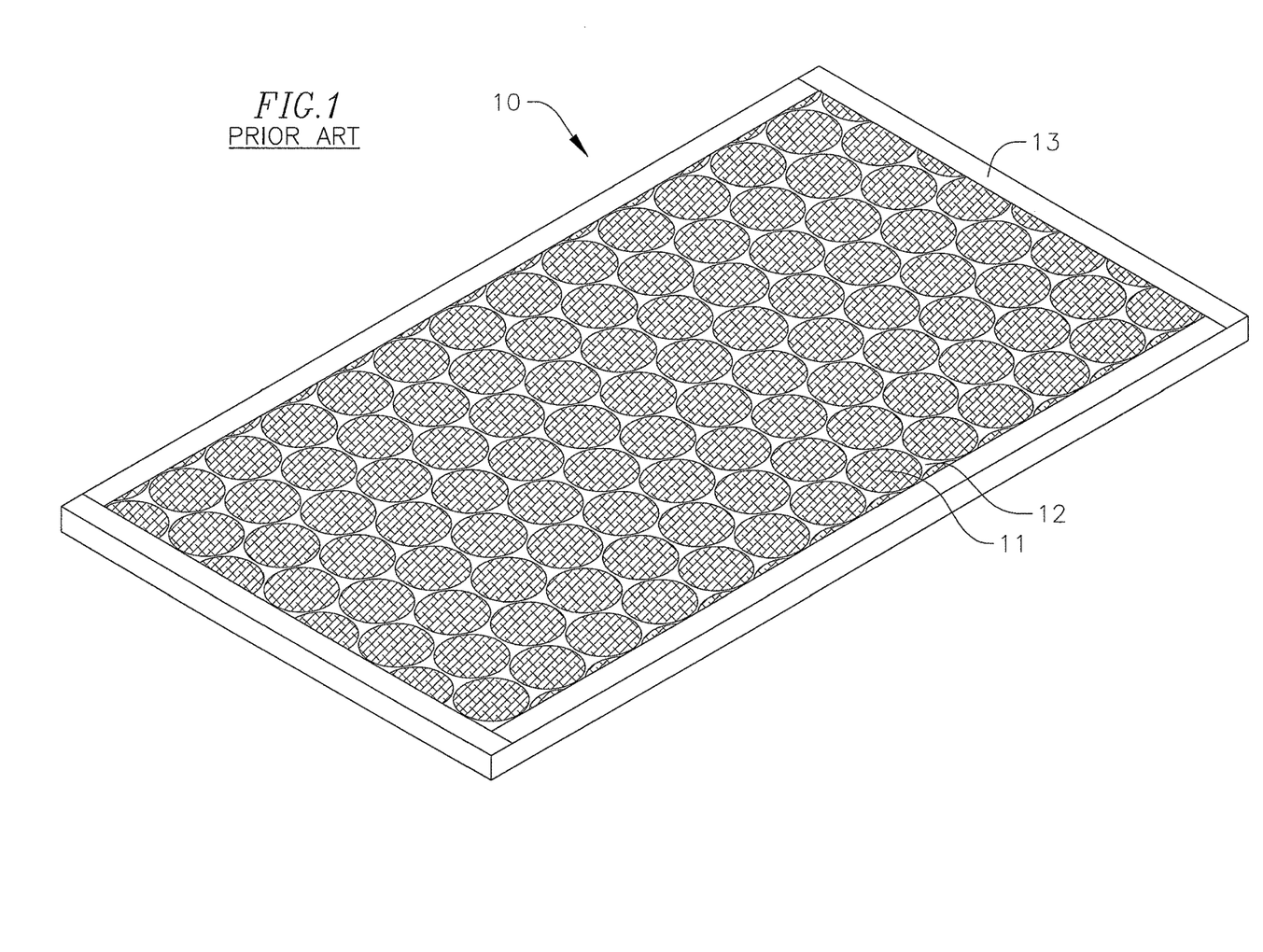
FIG. 1 is a perspective view of a prior art filter having a frame connecting a support member to a filter medium.

Air filters have been known in the art for many years. As illustrated in FIG. 1, many of these conventional air filters 10 include a filter medium 11 reinforced with a support member 12 placed adjacent to the filter medium 11 and a frame 13 that is adhered to a periphery of both the filter medium 11 and the support member 12 in order to keep the support member 12 and the filter medium 11 in contact. However, these filters 10 can be cumbersome to produce, and require the use of additional materials such as adhesive and cardboard that do not serve any filtering purpose, thereby limiting the production life and performance of the air filter. Moreover, such adhesives may degrade over time, thereby compromising the integrity of the filter.

SUMMARY

The present disclosure is directed to various embodiments of a filter configured to be used in a filtration system to filter particulate matter from a fluid. In one embodiment, the filter includes a filter medium and a support member. At least one inwardly deflected portion of the support member engages at least one portion of the filter medium to couple the support member to the filter medium. In one embodiment, the support member includes a series of spaced apart inwardly deflected portions. The inwardly deflected portion may be deflected inward at an angle between approximately 90 degrees and approximately 180 degrees. In one embodiment, the inwardly deflected portion of the support member is disposed along an edge of the support member. The filter medium may be constructed of any suitable filtration material, such as fiberglass, paper, vegetable fiber (e.g., cotton), or any combinations thereof. The support member may be constructed of any suitable material, such as metal (e.g., aluminum or steel), metal alloy, composites (e.g., carbon fiber reinforced plastic), plastic, or any combination thereof. In one embodiment, the support member is expanded metal. In another embodiment, the support member is wire mesh panel having a series of interconnected strands defining a series of openings therebetween (e.g., diamond-shaped openings). In a further embodiment, the support member is a flat plate defining a series of openings therein. The filter medium and the support member may have any suitable shape, such as circular, square, triangular, or hexagonal.

The present disclosure is also directed to various methods of manufacturing a filter. In one embodiment, the method includes deflecting a portion of a support member to engage at least one portion of a filter medium. The deflected portion of the support member may be angled inward between approximately 90 degrees and approximately 180 degrees. The engagement between the deflected portion of the support member and the filter medium is configured to couple the support member to the filter medium. In one embodiment, the task of deflecting the portion of the support member includes deflecting the portion of the support member upward, inward, and then downward. The deflected portion of the support member may be a portion of at least one edge of the support member or a portion of each edge of the support member. In one embodiment, the support member is rectangular, and the deflected portions are opposing edges of the support member. The opposing edges of the support member may be deflected either simultaneously or successively. In one embodiment, the task of deflecting the portion of the support member upward is performed by form rolling. The task of deflecting the portion of the support member inward may be performed by feeding the portion of the support member along a set of progressively angled form rollers (e.g., three form rollers) or by feeding the portion of the support member along a curved plate. In one embodiment, the task of deflecting the portion of the support member downward is performed by pinch rolling. The filter medium and the support member may have any suitable shape, such as circular, square, triangular, hexagonal, diamond-shaped, or cross-shaped. The filter medium may be constructed of any suitable filtration material, such as fiberglass, paper, or vegetable fiber (e.g., cotton), and the support member may be expanded metal, wire mesh, or a flat plate.

This summary is provided to introduce a selection of concepts that are further described below in the detailed description. This summary is not intended to identify key or essential features of the claimed subject matter, nor is it intended to be used in limiting the scope of the claimed subject matter.

BRIEF DESCRIPTION OF THE DRAWINGS

These and other features and advantages of embodiments of the present disclosure will become more apparent by reference to the following detailed description when considered in conjunction with the following drawings. In the drawings, like reference numerals are used throughout the figures to reference like features and components. The figures are not necessarily drawn to scale.

DETAILED DESCRIPTION

The present disclosure is directed to various embodiments of a filter having a filter medium and a support structure coupled to the filter medium. The filters of the present disclosure may be used in a variety of different devices to filter particulate matter from a fluid (e.g., air or water), such as residential or commercial air filtration systems, automobile filtration systems, and water filtration systems. Additionally, in example embodiments, the filters of the present disclosure are configured to obviate the need for separate mechanical means, such as fasteners or adhesive, securing the support structure to the filtration medium. Accordingly, the filters of the present disclosure are configured to reduce manufacturing costs, increase the effective filtration area of the filter by eliminating fasteners or adhesive that may obstruct the flow of fluid through the filter, and eliminate other undesirable performance characteristics associated with some conventional filters (e.g., fasteners used to secure the support structure to the filter medium may contact a hard surface within the air filtration device and thereby create undesirable knocking sounds). However, the filters of the present invention may include a frame and/or mechanical means (e.g., fasteners or adhesive) for securing the support structure to the filtration medium and still fall within the scope and spirit of the present disclosure.

Figures 2, 3:
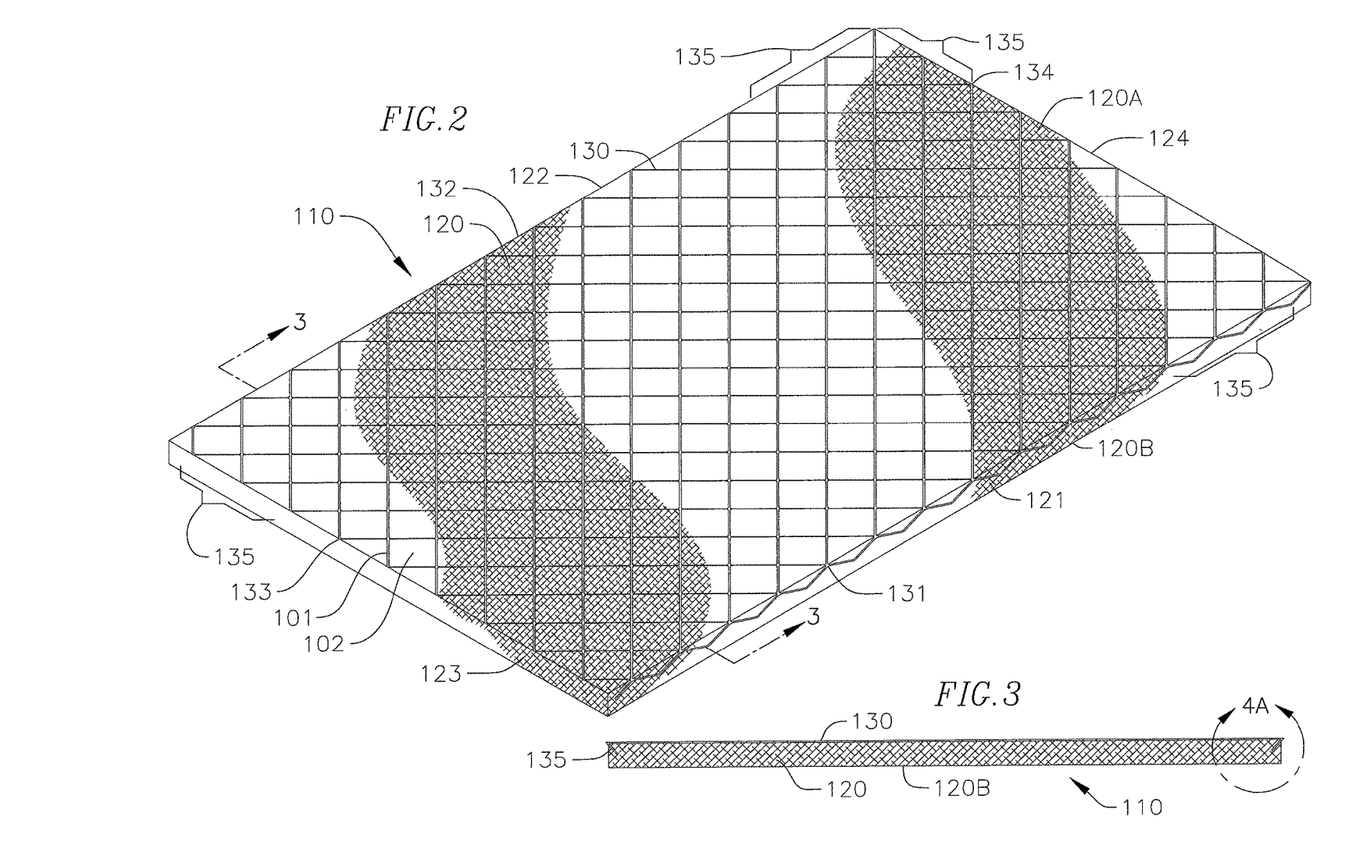
FIG. 2 is a perspective view of a filter according to one embodiment of the present disclosure.
FIG. 3 is a cross-sectional view of the filter of FIG. 2 taken along line 3-3.

With reference now to FIG. 2, a filter 110 according to one example embodiment of the present disclosure is illustrated. In the illustrated embodiment, the filter 110 includes a filter medium 120 and a support member 130 coupled to the filter medium 120. The support member 130 is configured to maintain the structural integrity of the filter 110 such that deformation of the filter medium 120 is minimized, or at least reduced, when subjected to external loads, such as loads from impeding air flow or water flow. Additionally, coupling the support member 130 to the filter medium 120 facilitates transportation and installation of the filter 110 as a single unit into a filtration unit.

In the illustrated embodiment, the filter medium 120 is generally rectangular and includes a front surface 120A, a rear surface 120B opposite the front surface 120A, a pair of longer sides 121, 122 extending in a longitudinal direction, and a pair of shorter sides 123, 124 extending in a direction transverse to the longitudinal direction. In one or more alternate embodiments, the filter medium 120 may have any other suitable shape, such as, for example, circular, square, triangular, or even irregularly shaped depending upon the application in which the filter 110 is intended to be used.

With continued reference to the embodiment illustrated in FIG. 2, the support member 130 is generally rectangular and includes a pair of longer edges 131, 132 extending in a longitudinal direction and a pair of shorter edges 133, 134 extending in a direction transverse to the longitudinal direction. In one or more alternate embodiments, the support member 130 may have any other suitable shape, such as, for example, circular, square, triangular, cross-shaped, diamond-shaped, trapezoidal, oval, or even irregularly shaped. Additionally, although in the illustrated embodiment the support member 130 has substantially the same shape as the filter medium 120, in one or more alternate embodiments, the support member 130 may have a different shape than the filter medium 120.

Figure 4A:
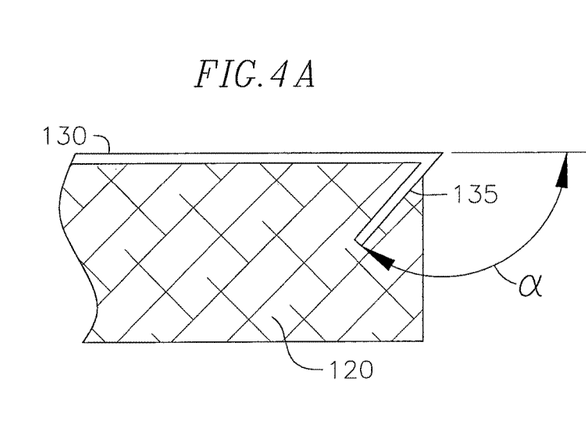
FIG. 4A is an enlarged partial view of the cross-sectional view illustrated in FIG. 3.
Figure 4B:
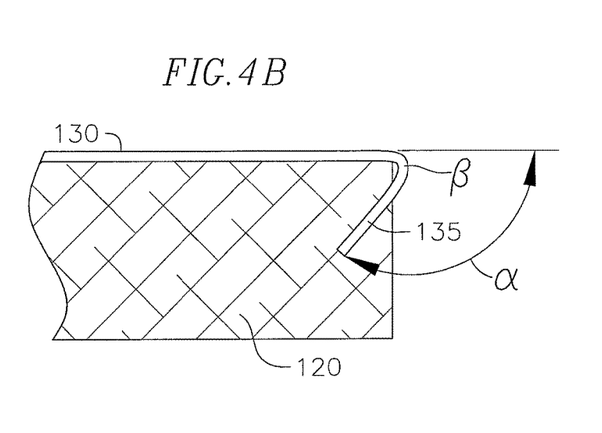
FIG. 4B is an enlarged partial view of an alternate embodiment of the cross-sectional view illustrated in FIG. 3.
Figure 4C:
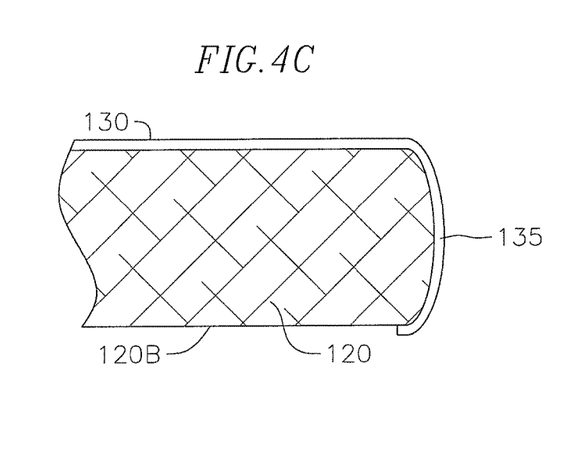
FIG. 4C is an enlarged partial view of another alternate embodiment of the cross-sectional view illustrated in FIG. 3.
Figure 4D:
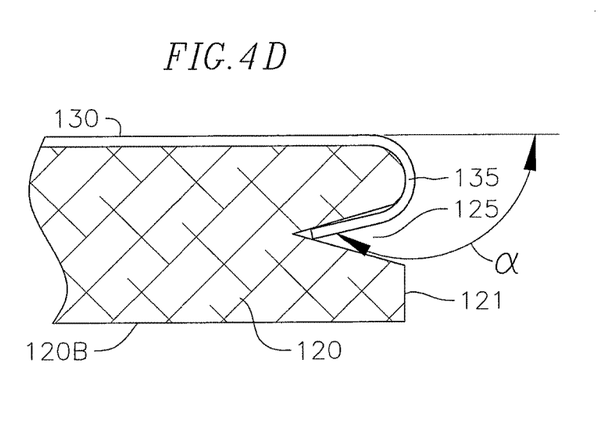
FIG. 4D is an enlarged partial view of another alternate embodiment of the cross-sectional view illustrated in FIG. 3.

With continued reference to FIG. 2, the support member 130 abuts the front surface 120A of the filter medium 120. The longer edges 131, 132 of the support member 130 are deflected inward to engage portions of the filter medium 120 such that the inwardly deflected portions 135 couple the support member 130 to the filter medium 120. In the illustrated embodiment, the longitudinal edges 131, 132 of the support member 130 wrap around the front surface 124 of the filter medium 120 and extend inward through the longitudinal sides 121, 122, respectively, of the filter medium 120 (i.e., the longitudinal edges 131, 132 of the support member 130 are deflected inward into the longitudinal sides 121, 122, respectively, of the filter medium 120). The longitudinal edges 131, 132 of the support member 130 may be deflected inward at any suitable angle α greater than approximately 90 degrees, as illustrated in FIG. 4A. For instance, in one embodiment, the longitudinal edges 131, 132 may be deflected inward approximately 135 degrees. In another embodiment, the longitudinal edges 131, 132 of the support member 130 may be deflected inward at an angle α of approximately 180 degrees. The inwardly deflected longitudinal edges 131, 132 of the support member 130 are configured to engage and retain the filter medium 120. Additionally, in one or more alternate embodiments, the shorter, transverse edges 133, 134 of the support member 130 may be inwardly deflected into the shorter, transverse sides 123, 124 of the filter medium 120 instead of, or in addition to, the inwardly deflected longitudinal edges 131, 132 of the support member 130. Although the inwardly deflected portions 135 of the support member 130 illustrated in FIG. 4A include a sharp bend, in other example embodiments the portions 135 may be deflected about a radius of curvature β, as illustrated in FIG. 4B. In further embodiments, the portions 135 of the support member 130 may extend around the entire longitudinal side 121, 122 of the support member and engage the rear surface 120B of the support member 120, as illustrated in FIG. 4C. In one example embodiment, the longitudinal sides 121, 122 of the filter medium 120 include a gap or a split 125 extending along the length of the longitudinal sides such that the inwardly deflected portions extend into the gaps or splits 125, as illustrated in FIG. 4D.

Moreover, in one or more alternate embodiments, only portions 135 of the edges 131, 132, 133, 134 of the support member 130 may be inwardly deflected. In one embodiment, only one portion 135 of each of the edges of the support member 130 may be inwardly deflected. For instance, in an embodiment in which the support member 130 is generally rectangular, one portion 135 of each of the longitudinal and transverse edges 131, 132, 133, 134 of the support member 130 may be inwardly deflected. The inwardly deflected portions 135 may extend any length along the edge 131, 132, 133, 134 of the support member 130 such that the support member 130 is suitably coupled to the filter medium 120. For instance, in one or more embodiments, the inwardly deflected portions 135 may span between approximately 5 percent and 100 percent of the total length of the respective edges 131, 132 of the support member 130. In alternate embodiments, the transverse edges 133, 134, or only portions 135 thereof, may be deflected inward to engage the filter medium 120 instead of, or in addition to, the inwardly deflected longitudinal edges 133, 134 or portions 135 thereof.

In the example embodiment illustrated in FIG. 2, the support member 130 comprises a sheet of expanded metal. The expanded metal support member 130 includes a plurality of interconnected strands 101 defining diamond-shaped openings 102 therebetween. As used herein, the term "plurality" means two or more. Suitable expanded metal sheets are described in United States Patent Application Publication No. 2011/0067372 A1 (Wallner et al.), the entire contents of which are hereby incorporated by reference.

In an alternate embodiment, the support member 130 comprises a wire mesh panel, also known as "welded wire" in the art. The wire mesh support member 30 includes a first plurality of strands extending in a first direction and a second plurality of strands extending in a second direction and interconnected to the first plurality of strands. The first plurality of strands may be interconnected to the second plurality of strands by any suitable means, such as welding (e.g., spot welding). Additionally, the first plurality of strands may be oriented at any suitable angle relative to the second plurality of strands, such as, for example, between approximately 30 degrees and approximately 120 degrees. The first plurality of strands and the second plurality of strands define a plurality of openings in the support member 130. Accordingly, the openings may be any suitable shape depending upon the orientation of the first plurality of strands relative to the second plurality of strands, such as, for example, diamond shaped, square, or rectangular. Additionally, the first and second plurality of strands may be non-linear such that the openings defined between the strands may have any other shape, such as, for example, ovular, circular, or irregularly shaped.

In another alternate embodiment, the support member 130 comprises a flat plate defining a plurality of openings. The openings in the flat plate may have any suitable shape and size configured to permit a sufficient volume of fluid to pass through the filter 110. For instance, the openings may be circular, oval, square, rectangular, triangular, hexagonal, or any other suitable shape. In one embodiment, the openings in the flat plate are arranged to maximize the effective filtration area of the filter (i.e., the portion of the filter medium 120 unobstructed by the support member 130). The openings in the flat plate may be formed by any suitable means, such as, for example, stamping, pressing, machining, laser cutting, or water jet cutting.

The support member 130 may be formed of any suitably strong and durable material, such as, for example, metal (e.g., aluminum, steel), metal alloys, composites (e.g., carbon fiber reinforced plastic), plastics, and any combinations thereof. The filter medium 120 may be formed of any material suitable to filter particulate matter (e.g., dust particles) from a fluid (e.g., air or water), such as, for example, fiberglass, paper, vegetable fibers (e.g., cotton), or any combinations thereof.

Figure 5:
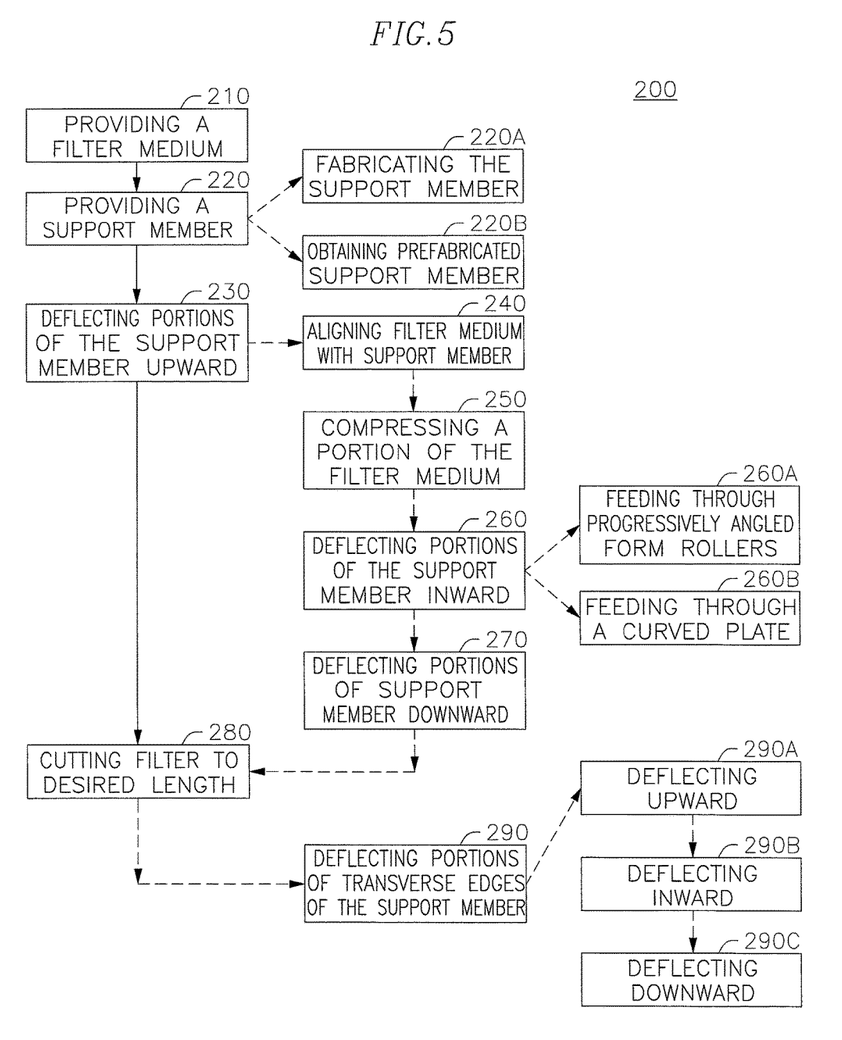
FIG. 5 is a flowchart illustrating tasks of manufacturing a filter according to one method of the present disclosure.

With reference now to FIG. 5, a method 200 of manufacturing a filter 110 according to embodiments of the present disclosure will now be described. The method 200 includes a task 210 of providing a filter medium 120 and a task 220 of providing a support member 130. As described above, the support member 130 may be any suitable structure configured to support the filter medium 120 and permit a fluid to pass through openings in the support member 130, such as, for example, expanded metal, wire mesh (also called "welded wire"), or a plate defining a plurality of openings therein. Additionally, as described above, the filter medium 120 may be formed from any suitable material, such as, for example, fiberglass, paper, vegetable fibers (e.g., cotton), or any combinations thereof. The task 220 of providing the support member 130 may include a task 220A of fabricating the support member 130, such as by welding strands to form a wire mesh, forming expanded metal by any suitable techniques, such as those described in United States Patent Application Publication No. 2011/0067372 (e.g., feeding a metal sheet blank through a die), or by forming openings in a flat plate, such as by machining, stamping, pressing, cutting, or by any other suitable methods. In an alternate embodiment, the task 220 of providing the support member 130 may include a task 220B of obtaining a pre-fabricated support member 130.

With continued reference to FIG. 5, the method 200 includes a task 230 of deflecting at least portions 135 (see FIG. 2) of the support member 130 upward. As used herein, the term "upward" defines any direction between zero degrees and 180 degrees relative to the remainder of the support member 130 (i.e., the non-deflected portion of the support member 130). As described in detail below, the portions 135 of the support member 130 which are deflected upward during task 230 will be further deflected in subsequent tasks to couple the support member 130 to the filter medium 120. In the illustrated embodiment of FIG. 2 in which the support member 120 is rectangular and includes a pair of longer, longitudinal edges 131, 132 and a pair of shorter, transverse edges, 133, 134, the task 230 may include deflecting upward the first and second longitudinal edges 131, 132, or portions 135 thereof, of the support member 130. In one embodiment, the first and second longitudinal edges 131, 132, or portions thereof 135, are deflected upward approximately 90 degrees (i.e., the first and second longitudinal edges 131, 132 are deflected upward such that the longitudinal edges 131, 132 are substantially orthogonal to the remainder of the support member 130). In an alternate embodiment, the longitudinal edges 131, 132, or portions 135 thereof, may be deflected upward at any other suitable angle, such as, for example, greater than 90 degrees. The task 230 of deflecting the longitudinal edges 131, 132, or portions 135 thereof, upward may be performed by any suitable means, such as, for example, roll forming.

After the longitudinal edges 131, 132 of the support member are deflected upward in task 230, the method 200 includes a task 240 of aligning the filter medium 120 with the support member 130 by abutting the support member 130 against the front surface 120A of the filter medium 120. In the aligned position, the filter medium 120 is disposed between the upwardly deflected longitudinal edges 131, 132, or portions 135 thereof, of the support member 130. Additionally, in the aligned position, the upwardly deflected portions 135 of the support member 130 extend from the front surface 120A of the filter medium 120 towards the rear surface 120B of the filter medium 120. The support member 130 may be aligned with the filter medium 120 in a variety of different configurations. For instance, the filter medium 120 may be stacked on top of the support member 130, the support member 130 may be stacked on top of the filter medium 120, or the filter medium 120 and the support member 130 may be aligned side-by-side. The task 240 of aligning the filter medium 120 with the support member 130 may be performed by any suitable means, such as, for instance, manually or mechanically (e.g., mechanically unfurling the filter medium 120 and the support member 130 from aligned spools 129, 139, respectively, as illustrated in FIGS. 6A and 7A).

The method 200 may also include a task 250 of compressing a portion of the filter medium 120 after the filter medium 120 has been aligned with the support member 130 during task 240. The task 250 of compressing a portion of the filter medium 120 is configured to maintain the alignment between the filter medium 120 and the support member 130 during subsequent manufacturing tasks. The task 250 of compressing a portion of the filter medium 120 may be performed by any suitable means. For instance, the task 250 may be performed by feeding the filter medium 120 and the support member 130 under a pair of skis 150, as illustrated in FIGS. 6A and 7A. In the illustrated embodiment, the skis 150 are spaced apart from the respective longitudinal sides 121, 122 of the filter medium 120 by approximately 2 inches to approximately 4 inches. It will be appreciated, however, that the skis 150 may be spaced apart from the longitudinal sides 121, 122 of the filter medium 120 by any other suitable distance, such as, less than approximately 2 inches or greater than approximately 4 inches. Additionally, the skis 150 are configured to raise a portion of the longitudinal sides 121, 122 of the filter medium 120, which facilitates coupling the support member 130 to the filter medium 120, as described below. In one or more example embodiments, the task 250 of compressing the filter medium 120 with the skis 150 creates a gap or split 125 along each of the longitudinal sides 121, 122 of the filter medium 120. The gaps or splits 125 defines openings into which the deflected portions 135 of the support member 130 may extend, as illustrated in FIG. 4D (i.e., the gaps or splits 125 may define openings into which the deflected portions 135 of the support member 130 are received by the filter medium 120). The task 250 of compressing the filter medium 120 may be performed contemporaneously with the next task 260 of deflecting the portions 135 of the support member 130 inward. In one or more alternate embodiments, the method 200 may not include the task 250 of compressing portions of the filter medium 120.

Figure 6A:
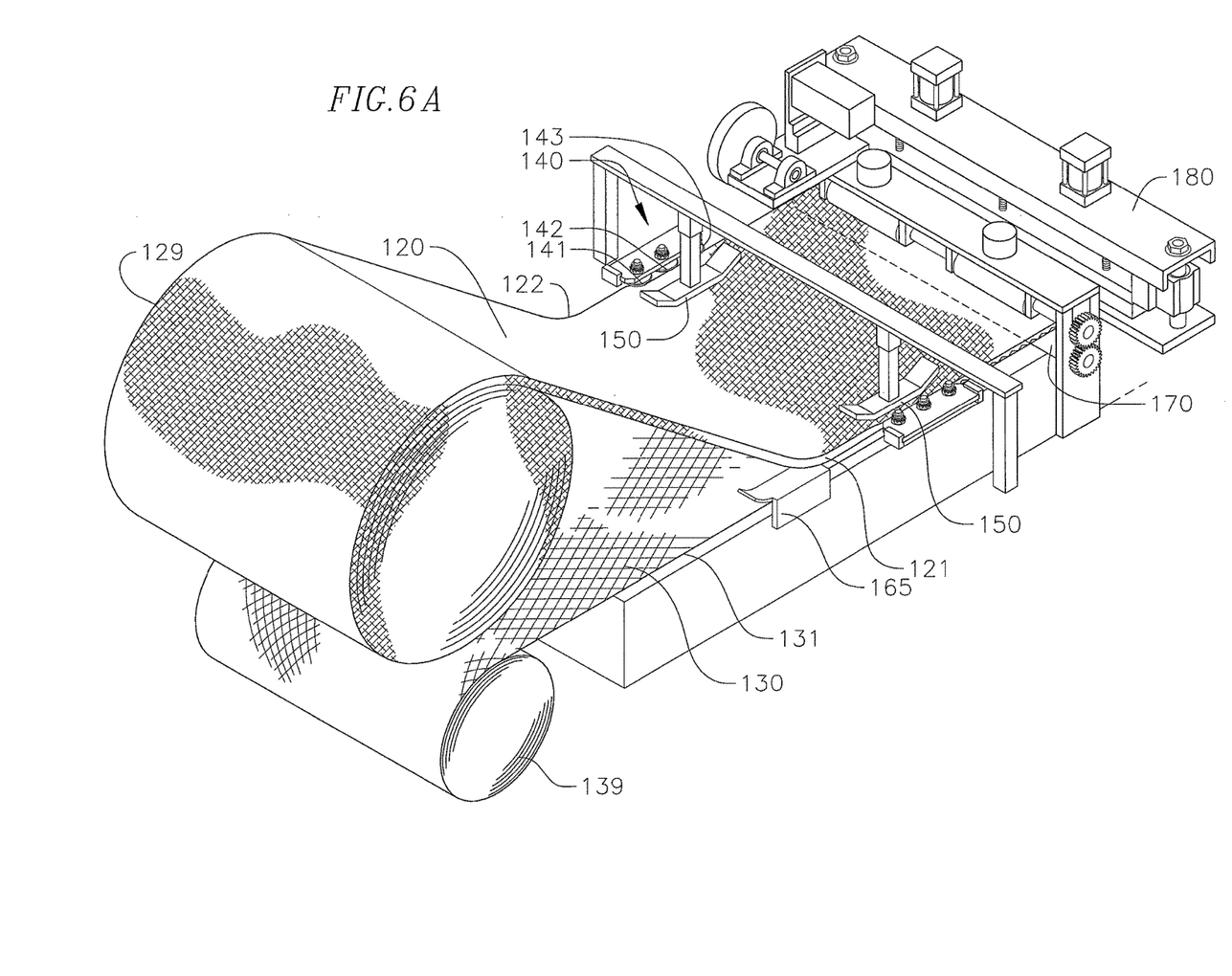
FIG. 6A is a perspective view of a pair of skis, a set of progressively angled form rollers, a pinch roller, and a shear sheet cutter configured to be used during one or more tasks of the method of manufacturing the filter.
Figure 7A:
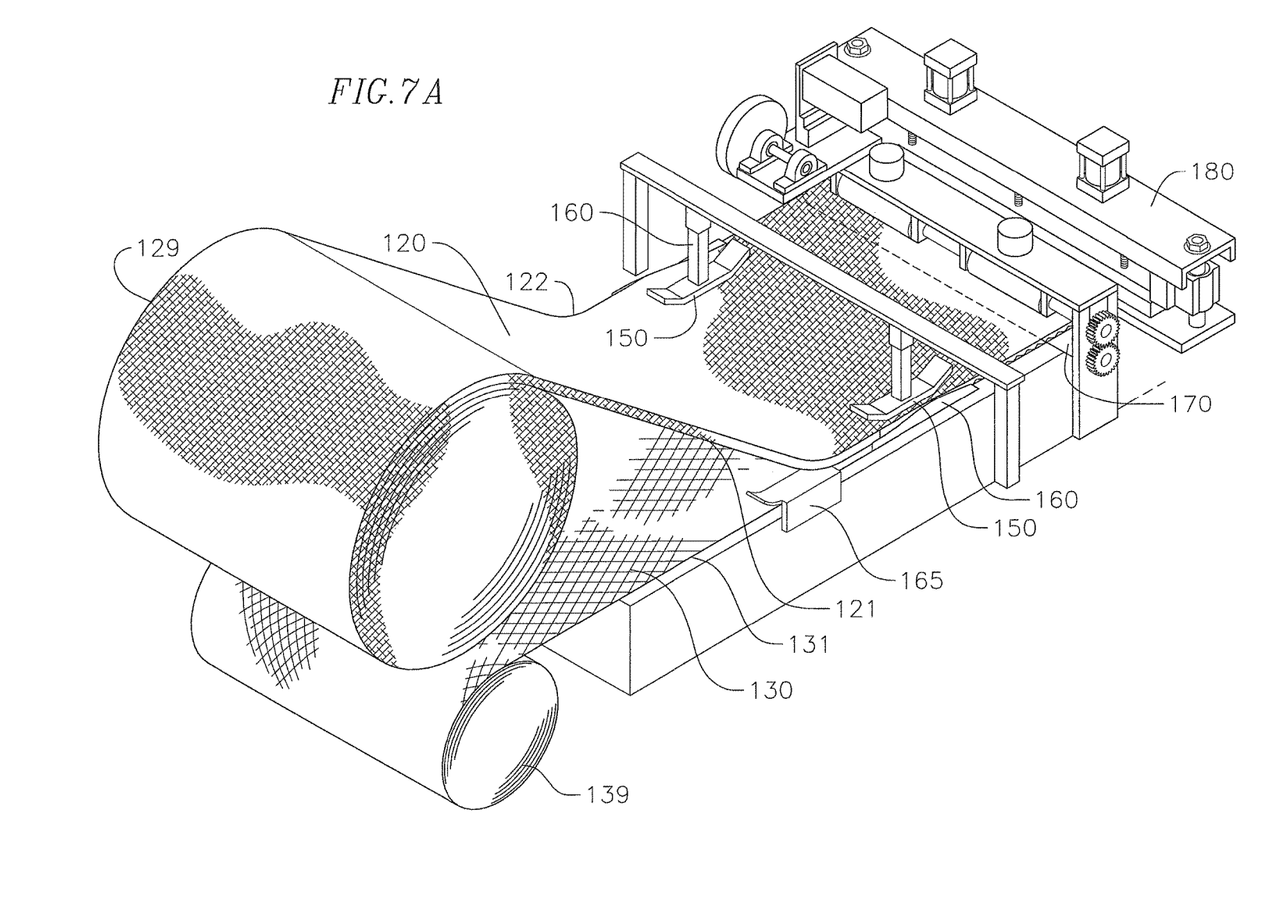
FIG. 7A is a perspective view of a pair of skis, a chute, a curved plate, a pinch roller, and a shear sheet cutter configured to be used during one or more tasks of the method of manufacturing the filter.

With continued reference to FIGS. 5, 6A, and 7A, the method 200 also includes a task of further deflecting portions 135 of the support member 130 to engage portions of the filter medium 120, thereby coupling the support member 130 to the filter medium 120. The method 200 includes a task 260 of deflecting inward the longitudinal edges 131, 132, or portions 135 thereof, of the support member 130 (i.e., the task 260 includes deflecting inward the portions 135 of the longitudinal edges 131, 132 which were previously deflected upward in task 230). Although the longitudinal edges 131, 132 are described herein as being deflected "inward," it will be appreciated that the longitudinal edges 131, 132 of the support member 130 are also deflected downward (i.e., toward the remainder of the support member 130) during task 260. As the longitudinal edges 131, 132 of the support member 130 are deflected inward, the longitudinal edges 131, 132 extend into the longitudinal sides 121, 122 of the filter medium 120, as illustrated in FIG. 4, thereby coupling the support member 130 to the filter medium 120. The longitudinal edges 131, 132 may be deflected inward to any suitable angle α greater than 90 degrees, such as, for example, between approximately 100 degrees and approximately 180 degrees, as illustrated in FIG. 4A through FIG. 4D.

Figure 6B:
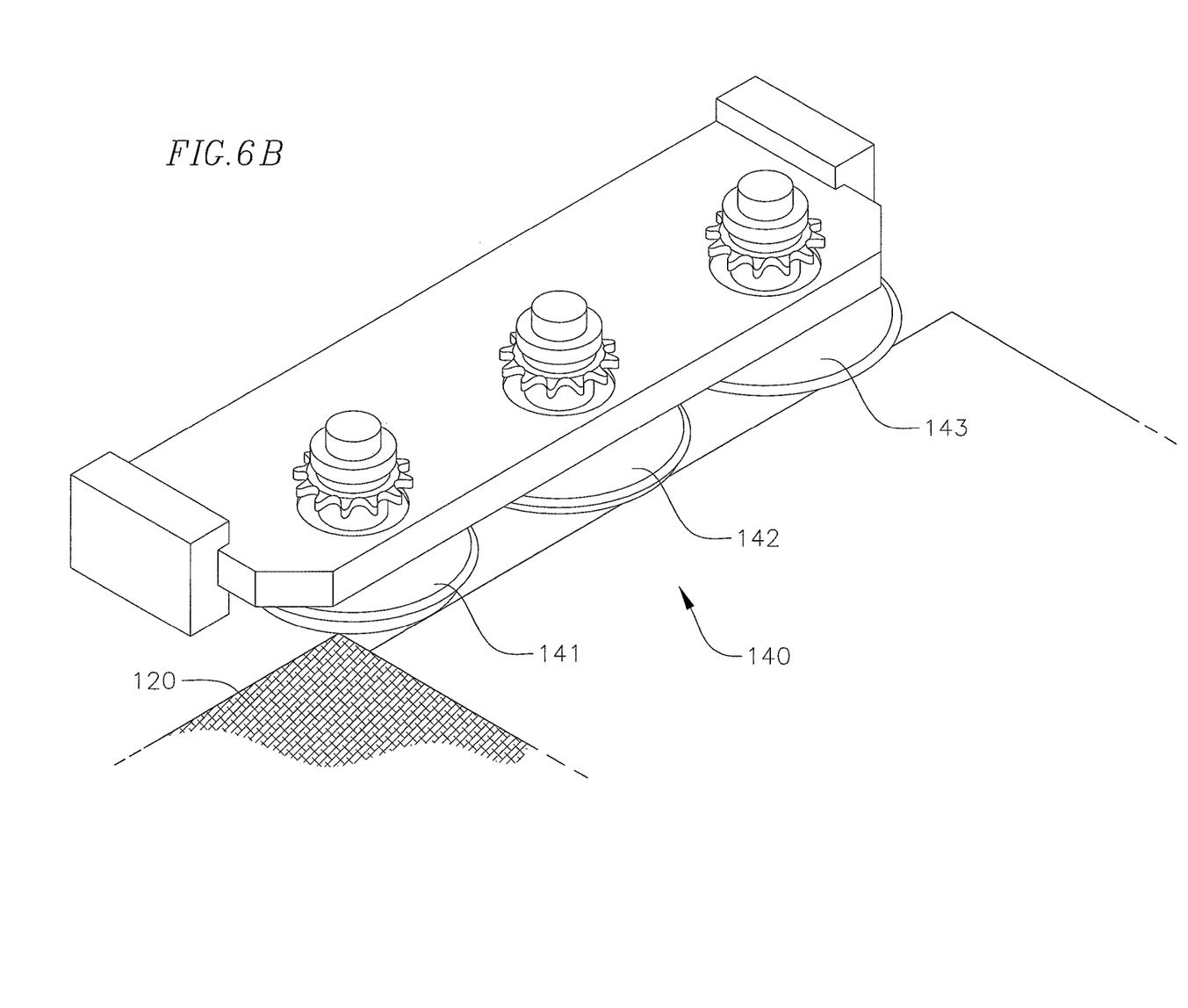
FIG. 6B is an enlarged perspective view of the set of the progressively angled form rollers of FIG. 6A.
Figure 6C:
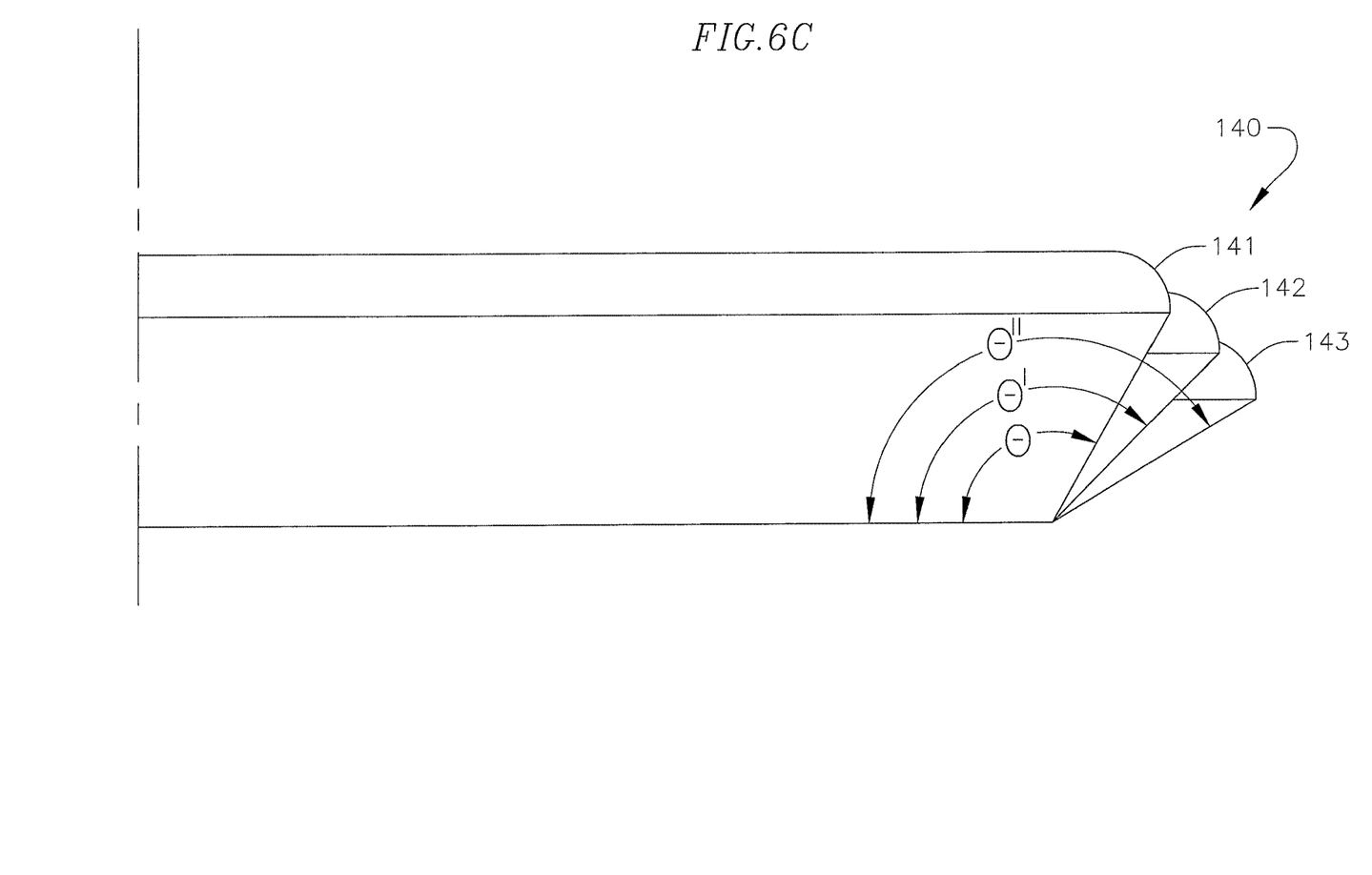
FIG. 6C is an enlarged partial side view of the set of progressively angled form roller of FIG. 6B.

The longitudinal edges 131, 132, or portions 135 thereof, may be deflected inward by any suitable means. For example, the longitudinal edges 131, 132 may be deflected inward by performing task a 260A of feeding the longitudinal edges 131, 132 of the support member 130 along a series of progressively angled form rollers 140, as illustrated in FIG. 6A through 6C. In the illustrated embodiment, each form roller 141, 142, 143 in the series of form rollers 140 is canted at a different angle such that each successive form roller 141, 142, 143 inwardly deflects the longitudinal edges 131, 132 of the support member 130 to a greater degree and the edges 131, 132 progressively extend inward as they slide along the rollers 141, 142, 143. In the illustrated embodiment, the form roller set 140 comprises three form rollers 141, 142, 143 (i.e., the form roller set 140 includes a first form roller 141, a second form roller 142, and a third form roller 143). In one embodiment, the first form roller 141 defines an angle θ of approximately 120 degrees, the second form roller 142 defines an angle θ' of approximately 135 degrees, and the third form roller 143 defines an angle θ" of approximately 150 degrees.

Accordingly, the longitudinal edges 131, 132 of the support member 130 will be initially deflected inward at an angle of approximately 120 degrees as the longitudinal edges 131, 132 are fed along the first form roller 141. The longitudinal edges 131, 132 will then be deflected further inward to an angle of approximately 135 as the longitudinal edges 131, 132 are fed along the second form roller 142 (i.e., the second form roller 142 is configured to deflect the longitudinal edges 131, 132 from an angle of approximately 120 degrees, the angle to which the first form roller 141 deflected the longitudinal edges 131, 132, to an angle of approximately 135 degrees). Finally, the longitudinal edges 131, 132 will be deflected inward to an angle of approximately 150 as the longitudinal edges 131, 132 are fed along the third form roller 143. The support member 130 will then exit the form roller set 140 having its longitudinal edges 131, 132 deflected inward at an angle of approximately 150 degrees. It will be appreciated, however, that the form rollers 140 may define any other suitable angles θ, θ', θ" and still fall within the scope and spirit of the present disclosure. Additionally, it will be appreciated that the form roller set 140 may include any other suitable number of form rollers 140 configured to deflect the longitudinal edges 131, 132 of the support member 130 inward, such as, for example, between two and six form rollers 140. In the illustrated embodiment, the form rollers 140 are adjacent to one another. In alternate embodiments, the form rollers 140 may be spaced apart from one another.

Figure 7B:
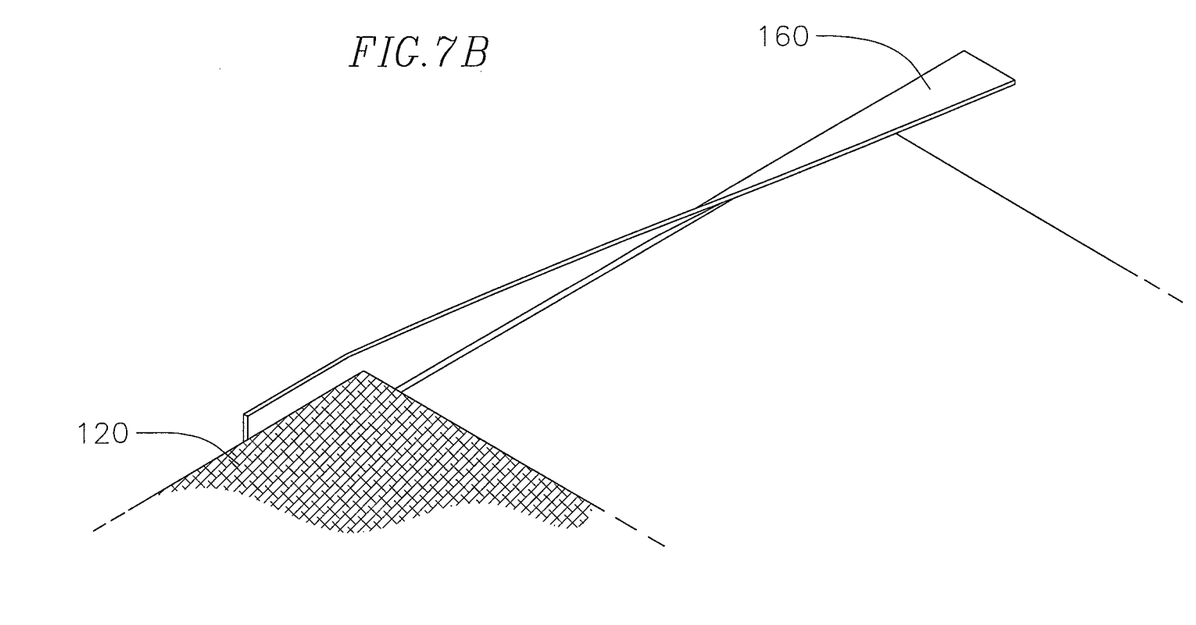
FIG. 7B is an enlarged perspective view of the curved plate of FIG. 7A.

In an alternate embodiment, the task 260 of deflecting inward the longitudinal edges 131, 132, or portions 135 thereof, of the support member 130 may be performed according to task 260B by feeding the longitudinal edges 131, 132 along a chute 165 and a curved plate 160 defining a progressively increasing angle, as illustrated in FIGS. 7A and 7B. The chute 165 is configured to maintain the positioning of the support member 130 while it is fed along the curved plate 160. In another embodiment, the task 260 of deflecting inward the longitudinal edges 131, 132 of the support member 130 may be performed by pneumatically, hydraulically, or electrically powered mechanical arms configured to retract and extend. The retraction and extension of the mechanical arm may be configured to selectively deflect only portions 135 of the edges 131, 132, of the support member 130.

With continued reference to FIGS. 6A and 7A, the method 200 may also include a task 270 of deflecting the longitudinal edges 131, 132, or portions 135 thereof, of the support member 130 downward. The task 270 of deflecting the longitudinal edges 131, 132 downward is configured to further secure the support member 130 to the filter medium 120. In one embodiment, the longitudinal edges 131, 132 of the support member 130 are deflected downward to an angle α (see FIG. 4) of approximately 180 degrees. That is, the longitudinal edges 131, 132 are deflected downward such that the longitudinal edges 131, 132 are substantially parallel with the remainder (i.e., the non-deflected portion) of the support member 130. However, the longitudinal edges 131, 132 of the support member 130 may be deflected downward to any other suitable angle, such as, for example, between approximately 150 degrees and approximately 170 degrees, and still fall within the scope and spirit of the present disclosure. The task 270 of deflecting the longitudinal edges 131, 132 of the support member 130 downward may be performed by any suitable means, such as, for example, pressing, pinch rolling with a pinch roller 170 (see FIG. 6A, 7A), stamping, or any combination thereof.

In one embodiment, the tasks 230, 260, and 270 of deflecting the longitudinal edges 131, 132 upward, deflecting the longitudinal edges 131, 132 inward, and deflecting the longitudinal edges 131, 132 downward, respectively, may be performed simultaneously for both longitudinal edges 131, 132 of the support member 130 (i.e., the longitudinal edges 131, 132 may be simultaneously deflected upward, simultaneously deflected inward, and then simultaneously deflected downward). In one or more alternate embodiments, the longitudinal edges 131, 132 may be deflected asynchronously. For instance, in one embodiment, the tasks 230, 260, and 270 may all be performed on the first longitudinal edge 131 and then subsequently the tasks 230, 260, and 270 may be performed on the second longitudinal edge 132 of the support member 130. In another embodiment, each of the tasks 230, 260, and 270 may be alternately performed on the longitudinal edges 131, 132 of the support member (i.e., task 230 may be performed on the first edge 131 and then subsequently on the second edge 132, then task 260 may be performed on the first edge 131 and then subsequently on the second edge 132, and finally task 270 may be performed on the first edge 131 and then subsequently on the second edge 132).

In one embodiment, the method 200 may also include a task 280 of cutting the filter 110 to any desired length. The task 280 of cutting the filter 110 may be performed by any suitable means, such as, for example, passing the filter 110 through a shear sheet cutter 180 (as illustrated in FIGS. 6A and 7A), manually cutting, or by any other suitable methods. In an alternate embodiment, the support member 130 and the filter medium 120 may be pre-cut to the desired length before engaging in any of the tasks 230 through 270.

In one embodiment, the method 200 may also include a task 290 of deflecting the shorter, transverse edges 133, 134 of the support member 130 to engage the filter medium 120. The task 290 may include a task 290A of deflecting the shorter, transverse edges 133, 134 of the support member 130 upward, a task 290B of deflecting the shorter, transverse edges 133, 134 inward into the shorter sides 123, 124 of the filter medium 120, and a task 290C of deflecting the shorter, transverse edges 133, 134 downward. In one embodiment, the tasks 290A, 290B, and 290C of deflecting the shorter, transverse edges 133, 134 of the support member 130 into the filter medium 120 are configured to complement the deflected, longitudinal edges 131, 132 of the support member 130 in securing the support member 130 to the filter medium 120. These tasks 290A, 290B, and 290C of deflecting the shorter, transverse edges 133, 134 of the support member 130 may be performed in addition to or, instead of, the tasks 230, 260, and 270 of deflecting the longer, longitudinal edges 131, 132 of the support member 130. The tasks 290A, 290B, and 290C of deflecting the shorter, transverse edges 133, 134 of the support member 130 may be performed in the same or similar manner and with the same or similar techniques as the tasks 230, 260, and 270 of deflecting the longitudinal edges 131, 132 of the support member 130, as described above. The assembled filter 110 may then be installed in any desired filtration device, such as residential or commercial air filtration systems, automobile filtration systems, or water filtration systems.

Although the method 200 of manufacturing the filter 110 has been described above with reference to a rectangular filter medium 120 and a rectangular support member 130, it will be appreciated that the same or similar tasks may be performed with support members 130 and filter media 120 having any other shapes, such as, for example, square, ovular, circular, trapezoidal, or irregularly shaped. In embodiments in which the support member 130 has a shape having an arcuate periphery, such as a circle, the arcuate periphery is defined as the edge 131 of the support member 130.

Additionally, although tasks 230, 260, and 270 have been described above with reference to deflecting entire edges of the support member 130, in one or more alternate embodiments, only a portion or portions 135 of the edges 131, 132, 133, 134 of the support member 130 may be deflected during tasks 230, 260, and 270. For instance, in an embodiment in which the support member 130 is generally rectangular, only one portion 135 of each of the longitudinal and transverse edges 131, 132, 133, 134 of the support member 130 may be inwardly deflected as illustrated in FIG. 2. In an alternate embodiment, two or more portions 135 of each of the edges 131, 132, 133, 134 of the support member 130 may be inwardly deflected. The inwardly deflected portions 135 of the support member 130 may be spaced at regular intervals along the edges 131, 132, 133, 134 in a repeating pattern or may be spaced at irregular intervals along the edges 131, 132, 133, 134. The inwardly deflected portions 135 may span any length along the edges 131, 132, 133, 134 of the support member 130 such that the support member 130 is suitably coupled to the filter medium 120. For instance, in one or more embodiments, the inwardly deflected portions 135 may span between approximately 5 percent and 100 percent of the total length of the respective edges 131, 132, 133, 134 of the support member 130. Accordingly, it will be appreciated that all or fewer than all of the edges 131, 132, 133, 134 of the support member 130 may be deflected, in whole or in part, during the method 200 of manufacturing the filter 110 according to various embodiments of the present disclosure.

While in one embodiment, the method 200 of manufacturing the filter 110 may include each of the tasks described above and shown in FIG. 5, in other embodiments of the present invention, one or more of the tasks described above and shown in FIG. 5 may be absent and/or additional tasks may be performed. For instance, in one embodiment, the task 270 of deflecting downward the longitudinal edges 131, 132 of the support member 130 may not be performed. Furthermore, in the method 200 of manufacturing the filter 110 according to one embodiment, the tasks may be performed in the order depicted in FIG. 5. However, the present disclosure is not limited thereto and, in a method 200 of manufacturing the filter 110 according to other embodiments of the present disclosure, the tasks described above and shown in FIG. 5 may be performed in any other suitable sequence. For instance, in one embodiment, the task 240 of aligning the filter medium 120 with the support member 130 may be performed before the task 230 of deflecting upward the first and second longitudinal edges 131, 132 of the support member 130, while in another embodiment, the task 230 of deflecting upward the first and second longitudinal edges 131, 132 of the support member 130 may be performed before the task 240 of aligning the filter medium 120 with the support member 130.

While this invention has been described in detail with particular references to exemplary embodiments thereof, the exemplary embodiments described herein are not intended to be exhaustive or to limit the scope of the invention to the exact forms disclosed. Persons skilled in the art and technology to which this invention pertains will appreciate that alterations and changes in the described structures and methods of assembly and operation can be practiced without meaningfully departing from the principles, spirit, and scope of this invention, as set forth in the following claims. Although relative terms such as "outer," "inner," "upper," "lower," "below," "above," "vertical," "horizontal," and similar terms have been used herein to describe a spatial relationship of one element to another, it is understood that these terms are intended to encompass different orientations of the various elements and components of the invention in addition to the orientation depicted in the figures. Additionally, as used herein, the term "substantially" and similar terms are used as terms of approximation and not as terms of degree, and are intended to account for the inherent deviations in measured or calculated values that would be recognized by those of ordinary skill in the art.

What is claimed is:

1. A filter comprising:
a fluid filter medium for filtering particulate matter from a fluid comprising a first surface opposite a second surface and a side surface extending from the first surface to the second surface; and
an expanded metal over the first surface, wherein said filter medium comprises a length and a width transverse to said length, wherein said expanded metal extends across an entire of said width, wherein an inwardly deflected portion of the expanded metal extends over the side surface and toward the side surface, said inwardly deflected portion directly engages at least a portion of the filter medium securing the expanded metal to the filter medium for forming a unitary structure with the filter medium without requiring a frame for forming said unitary structure.

2. The filter of claim 1, wherein the inwardly deflected portion of the expanded metal penetrates the filter medium from the side surface.

3. The filter of claim 1, wherein a material of the filter medium is selected from the group of materials consisting of fiberglass, paper, cotton, and combinations thereof.

4. The filter of claim 1, wherein the expanded metal comprises:
a first plurality of strands extending in a first direction; and
a second plurality of strands extending in a second direction, wherein the first plurality of strands is interconnected to the second plurality of strands.

5. The filter of claim 4, wherein the first plurality of strands is interconnected to the second plurality of strands by welding.

6. The filter of claim 4, wherein the first plurality of strands and the second plurality of strands define a grid of diamond-shaped openings.

7. The filter of claim 1, wherein the expanded metal is rectangular.

8. The filter of claim 1, wherein the inwardly deflected portion comprises a plurality of spaced part inwardly deflected portions.

9. The filter of claim 1, wherein the inwardly deflected portion is deflected inward at an angle between approximately 90 degrees and approximately 180 degrees.

10. The filter of claim 1, wherein the filter medium comprises fiberglass.

11. The filter of claim 10, wherein the inwardly deflected portion of the expanded metal penetrates the filter medium from the side surface.

12. The filter of claim 1, wherein the deflected portion extends to the second surface.

13. The filter of claim 1, wherein the expanded metal extends over the entire first surface.

14. The filter of claim 13, wherein the side surface is a peripheral side surface defining a peripheral side, said peripheral side surface having a first section opposite a second section and a third section opposite a fourth section, wherein the third and fourth sections extend from the first section to the second section, wherein each of the first and second surfaces extend from the first section to the second section and from the third section to the fourth section, wherein the inwardly deflected portion of the expanded metal penetrates the filter medium from at least two of the first, second, third and fourth sections of said peripheral side surface.

15. The filter of claim 14, wherein the inwardly deflected portion of the expanded metal penetrates the filter medium from the first and second sections of said peripheral side surface.

16. The filter of claim 11, wherein the deflected portion extends to the second surface.

17. The filter of claim 11, wherein the expanded metal extends over the entire first surface.

18. The filter of claim 17, wherein the side surface is a peripheral side surface defining a peripheral side, said peripheral side surface having a first section opposite a second section and a third section opposite a fourth section, wherein the third and fourth sections extend from the first section to the second section, wherein each of the first and second surfaces extend from the first section to the second section and from the third section to the fourth section, wherein the inwardly deflected portion of the expanded metal penetrates the filter medium from at least two of the first, second, third and fourth sections of said peripheral side surface.

19. The filter of claim 18, wherein the inwardly deflected portion of the expanded metal penetrates the filter medium from the first and second sections of said peripheral side surface.

20. The filter of claim 11, wherein the inwardly deflected portion is deflected inward at an angle between approximately 90 degrees and approximately 180 degrees.

21. A filter comprising:
a fluid filter medium for filtering particulate matter from a fluid comprising a first surface opposite a second surface and a side surface extending from the first surface to the second surface; and
an expanded metal over the first surface, wherein said filter medium comprises a length and a width transverse to said length, wherein said expanded metal extends across an entire of said width, wherein a portion of the expanded metal extends over the first surface, the side surface and the second surface, sandwiching said filter medium there-between, securing the expanded metal to the filter medium for forming a unitary structure with the filter medium without requiring a frame for forming said unitary structure.

22. The filter of claim 21, wherein the expanded metal extends over the entire first surface.

23. The filter of claim 21, wherein the side surface is a peripheral side surface defining a peripheral side, said peripheral side surface having a first section opposite a second section and a third section opposite a fourth section, wherein the third and fourth sections extend from the first section to the second section, wherein each of the first and second surfaces extend from the first section to the second section and from the third section to the fourth section, wherein the expanded metal extends over at least two of the first, second, third and fourth sections and extends from those two sections over the second surface, sandwiching the two sections of the filtering medium there-between.

24. The filter of claim 23, wherein the expanded metal extends over the first and second sections of said peripheral side surface.

25. The filter of claim 1, wherein the first surface of the filter medium is generally planar.

26. The filter of claim 21, wherein the first surface of the filter medium is generally planar.

\* \* \* \* \*